United States Patent Office 2,877,206
Patented Mar. 10, 1959

2,877,206

PROCESS FOR THE PEROXIDE TREATMENT OF BLENDS OF POLYMERS OF 1-OLEFINS AND HYDROGENATED DIENE POLYMERS AND PRODUCTS THEREOF

Johnny N. Scott, Bartlesville, Okla., assignor to Phillips Petroleum Company, a corporation of Delaware No Drawing. Application December 16, 1955
Serial No. 553,422

10 Claims. (Cl. 260—45.5)

This invention relates to peroxide treatment of blends of polymers of 1-olefins and hydrogenated diene polymers. In one aspect, this invention relates to a method by which the elongation of polyethylene/hydrogenated butadiene polymers can be increased.

A great many plastic materials are now available for the fabrication of various articles. Each of these materials has many general uses and there are certain specialized uses for which a particular material alone is most suitable. Certain specialized uses have been developed for blends of these materials. The present invention relates to a blend of a polymer of a 1-olefin with a diene polymer, which has been hydrogenated to produce a polymer having an unsaturation of less than 50 percent of the theoretical unsaturation of such a polymer. More specifically, this invention relates to a method of treatment of such blends in order to improve the physical properties of the blend. The final products generally have a much greater elongatiton than the original blend and, in most instances, the flex temperature is lower and the tensile strength and impact strength are increased.

My invention relates to treatment of the blend of the two polymers with an organic peroxide or hydroperoxide.

The following are objects of this invention.

An object of this invention is to provide a method of treating blends of polymeric materials. A further object of this invention is to provide blends of polymers of 1-olefins with polymers of conjugated dienes which have been hydrogenated to a value of at least 50 percent of theoretical.

Other objects and advantages of this invention will be apparent to one skilled in the art upon reading the accompanying disclosure.

Broadly, my invention is directed to treatment of blends of polymers of 1-olefins with polymers of conjugated dienes which have been hydrogenated to provide a residual unsaturation of less than 50 percent of theoretical, with an organic peroxide or hydroperoxide at an elevated temperature. The particular polymeric materials which I believe will have the greatest utilization according to my invention are polyethylene and hydrogenated polybutadiene. These specific polymeric materials will be referred to in the discussion, but it should be realized that the invention is not limited to polyethylene and hydrogenated polybutadiene. Preferably, the polyethylene is prepared by use of a chromium oxide catalyst. Suitable polymers of olefins can also be obtained by polymerization of olefins in the presence of multicomponent catalysts comprising mixtures of aluminum trialkyls and compounds of metals of subgroups 4 to 6 of the periodic system, including thorium and uranium. Salts of titanium, zirconium, thorium, uranium and chromium are especially good. Mixtures of tetrachlorides, oxychlorides, or acetylacetonates of these metals with aluminum trialkyls rapidly convert ethylene to high molecular weight polyethylene, even at low pressures and temperatures, the reaction usually being carried out in a reaction medium comprising an aliphatic or hydroaromatic hydrocarbon such as pentane, hexane, cyclohexane, tetrahydronaphthalene, and the like. Specific catalyst systems for the polymerization of ethylene to high molecular weight polyethylene include triethylaluminum and titanium tetrachloride, tridodecylaluminum and titanium tetrachloride, triethylaluminum and zirconium acetylacetonate, triethylaluminum and tungsten hexachloride, triethylaluminum and $K_2TiF_6$, and triisobutylaluminum and zirconium tetrabutoxide. Polyethylene produced by these processes has a specific gravity of at least 0.94, compared to a specific gravity of approximately 0.92 for other polyethylenes commercially available at the present time. It is further distinguished from the polyethylenes commercially available at the present time by percentage crystallinity as determined by nuclear magnetic resonance of at least 80, usually 90 and above. Finally, although the improvements are not as great, the so-called high pressure polyethylenes can be used in this invention. Polymers prepared at pressures below 500 or 700 p. s. i. g. are preferred.

When preparing the plastic compositions of this invention, a blend of the ethylene polymer and the hydrogenated butadiene polymer is generally prepared first, the organic peroxide or hydroperoxide is added, and mixing is contained until the peroxidic material is dispersed throughout the polymer blend. The peroxide or hydroperoxide is frequently dissolved or dispersed in an inert solvent, e. g., benzene, toluene, xylene, methyl cyclopentane, methylcyclohexane, octanes, or the like, in order to facilitate its incorporation in the polymer blend.

Treatment of the ethylene polymer-hydrogenated butadiene polymer blends with an organic peroxide or hydroperoxide is effected at a temperature in the range between 200° and 500° F., frequently designated as the curing temperature. The curing time is dependent upon the temperature and the peroxidic material used and will generally be in the range between 5 to 60 minutes.

In one method of operation, the ethylene polymer and hydrogenated butadiene polymer are blended on a hot mill, i. e., 300° F., the milling temperature is lowered, if necessary, to a level which will permit incorporation of the peroxidic material before decomposition occurs, and milling is continued at the required temperature and for the time necessary to produce a homogeneous composition, evaporate the solvent, and yield a product having the improved properties hereinbefore noted. This method is suitable where the blend contains large amounts of polyethylene and remains thermoplastic following curing. In other instances, milling is continued only until the peroxidic material is incorporated in the polymer blend and the solvent removed. Then the composition is subsequently heated at the desired temperature to bring about the reaction with the peroxidic material. In any event, curing is effected at a temperature above the decomposition temperature of the peroxidic material and the curing time is the time the composition is maintained at this temperature regardless of whether or not milling is performed during this period.

While this invention is not dependent upon any particular reaction or reaction mechanism, it is believed that the increase in elongation of the product over a similar composition which has not been treated with a peroxidic material indicates internal plasticization and chain branching. In all probability the peroxidic material brings about the formation of a graft polymer. Increasing the elongation increases the flexibility of the product and generally gives a lower flex temperature, higher tensile strength, and lower solubility in organic solvents such as methylcyclohexane and the like.

The polymers of the 1-olefins suitable for use in this invention are preferably prepared by the method disclosed in a copending application of Hogan and Banks, Serial No. 476,306, filed December 20, 1954, now abandoned.

Hogan and Banks described a process wherein tacky polymeric products and/or solid polymers, are obtained by polymerizing olefinic compounds in the presence of chromium oxide associated with at least one porous oxide selected from the group consisting of silica, alumina, zirconia, and thoria. Chromium oxide containing hexavalent chromium is an essential catalytic ingredient for the production of high molecular weight tacky and/or solid polymers. This catalyst comprising chromium oxide is highly active in polymerizing certain olefins to these heavy polymers. However, its capacity to polymerize olefins to maximum yields of tacky and solid polymers appears to be highest in connection with 1-olefins of maximum chain length of 8 carbon atoms and no branching nearer the double bond than the 4-position. Other olefins, such as 2-butene, can be included in the feed. It does polymerize olefins other than those mentioned, but the polymers are preponderantly normally liquid.

The polymers prepared by the process of Hogan and Banks are characterized by the fact that their unsaturation is preponderantly of the trans-internal or terminal vinyl type. Trans-internal type of unsaturation is represented by the formula

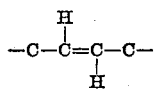

while terminal vinyl unsaturation is characterized by the structure —CH=CH$_2$. Ethylene polymers prepared using this catalyst system are composed perponderantly of normally solid material; only small amounts of tacky or liquid polymer are ordinarily produced from ethylene. The weight average molecular weights are in the range of approximately 5,000 to 50,000 and higher.

The polymerization of propylene over this catalyst system yields a product of about 2,000 to 20,000 average molecular weight. The molecular weight of narrow fractions of the polypropylene produced in the presence of chromium oxide supported on silica, alumina, or silica-alumina range from about 200 to 50,000. This polypropylene contains about 10 to 20 weight percent of material boiling below 900° F. This fraction is an oil having an initial boiling point of about 400° F. The fraction boiling above 900° F. contains both tacky and solid polymer.

The chromium oxide catalyst can be prepared by impregnation of particulate silica, alumina, or silica-alumina, for example, with a solution of chromium oxide or a compound convertible to the oxide by calcination, followed by drying and activation of the composite at a temperature in the range of 750 to 1500° F. for a period of 3 to 10 hours or more. Activation is conducted by heating in a stream of gas. It is preferred that the gas contain oxygen and be substantially water-free. However, inert gases, such as carbon dioxide and nitrogen, can be used. It is found that within this activation range of temperature treatment of the catalyst, the character of the polymer can be controlled. When the catalyst is activated at temperatures in the upper part of the range, particularly from 1300 to 1500° F., the polymers obtained from propylene and heavier olefins have a lower average molecular weight and contain less tacky and solid polymer, while activation temperatures in the lower part of the range produce a catalyst which effects an increase in molecular weight of the polymer and the production of larger proportions of heavy tacky and solid polymer. The catalyst can be prepared using, as starting material, chromium trioxide, chromic nitrate, chromic acetate, chromic chloride, chromic sulfate, ammonium chromate, ammonium dichromate, or other soluble salts of chromium. The highest conversions were obtained from the catalyst that contained only chromium oxides after activation. Impregnation with chromium trioxide (CrO$_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 10 or more weight percent. Chromium contents as high as 50 weight percent are operative, but amounts above 10 weight percent appear to have little added advantage. A preferred non-chromium component or "support" is a silica-alumina composite containing a major proportion of silica and a minor proportion of alumina. One support that has been found particularly effective is a coprecipitated 90 percent silica-10 percent alumina support. It is found that steam treatment of this support, i. e., silica-alumina, or silica without appreciable alumina, improves the activity and life of the catalyst composite in a polymerization reaction. A silica support of lower surface area and large pore size is a better support than one having extremely high surface area and small pore size. These factors are believed to be of importance in the removal of the heavy polymer from the surface of the catalyst composite. A chromium oxide-alumina catalyst has about two-thirds the activity of a chromium oxide-silica-alumina catalyst. It is necessary for some of the chromium to be in the hexavalent state to act as an active promoter or catalyst for the polymerization reaction of Hogan and Banks. It is preferred to use catalyst in which the amount of hexavalent chromium is at least 0.1 percent of the weight of the catalyst composite, as determined by ascertaining the water-soluble chromium present by leaching with water and determining the dissolved chromium in the leachings.

The preferred steam activation of the silica-alumina base of the catalyst is conducted at a temperature of approximately 1200° F. for 10 hours utilizing 5 volume percent steam admixed with 95 volume percent air. In the steam activation treatment, the temperature can be varied from 1100 to 1300° F. and the steam content of the steam-air mixture can range from about 3 to about 10 percent. The time of treatment can vary from about 4 to about 15 hours.

The molecular weight of the product can be changed by pretreating the catalyst base, preferably before addition of the chromium oxide, with a fluoride, alone or in aqueous solution, e. g., aqueous or anhydrous hydrogen fluoride or other organic or inorganic fluoride, especially a volatile fluoride, and heating, e. g., at from 300 to 1100° F. for from 0.5 to 10 hours, to remove residual fluoride. The treatment results in a catalyst which, after addition of the chromium oxide, produces a polymer of increased molecular weight and flexibility. From 0.001 to 0.2 part by weight of fluoride per weight of oxide produces the improved results.

The terms "support" or "base," as used herein, are not to be narrowly interpreted. They are not limited to mere inert components of the catalyst mass. The non-chromium components appear to impart to the catalyst at least part of its activity, and variations in their identity and proportions affect the catalyst activity. The "support" is preferably utilized in porous form, e. g., a gel.

The temperature to be used in carrying out the polymerization reaction can vary over a broad range but normally ranges from about 150 to 450° F. The preferred range for propylene and higher olefins is 150 to 250° F., and that for ethylene is 275 to 375° F. when a fixed bed of catalyst is utilized. When a mobile catalyst is used, the optimum polymerization temperature range is 200 to 350° F. for ethylene. At temperatures lower than those in the preferred ranges, the rate of catalyst deactivation increases and catalyst-bed plugging may occur, and at temperatures higher than those in the preferred ranges, the rate of catalyst deactivation increases and polymer molecular weight decreases.

The pressure is preferably high enough to maintain the diluent in the liquid phase and to assure that olefins not liquefied under these conditions are dissolved in the liquid phase in sufficient amount. This often, but not invariably, requires a pressure of at least 100 to 300 p. s. i., depending on the feed and the temperature, a pressure of approximately 500 p. s. i. is to be preferred. The pressure can be as high as 700 p. s. i. or higher, if desired. As a general rule, high pressures favor the production of higher molecular weight polymers, all other conditions being constant, up to the pressure sufficient to provide complete liquefaction, additional pressure having practically no effect. The feed rate can range from 0.1 to 20 liquid hourly space velocity with a preferred range of 1 to 6 liquid hourly space velocity in the liquid-phase process with fixed-bed catalyst. Hydrocarbon diluents, preferably paraffins and/or cycloparaffins, serve as solvents for the polymer products to aid in the removal of the product from the catalyst in the reactor. The diluents include aliphatic paraffins having from 3 to 12, preferably 5 to 12, carbon atoms per molecule. Any of the paraffins which is a solvent for the heavy polymer at temperatures in the operating range is suitable. Cycloparaffinic solvents are discussed in more detail in copending application Serial No. 450,225, filed August 16, 1954. Any hydrocarbon diluent which is relatively inert, non-deleterious, and liquid under the reaction conditions of the process can be utilized. Diluents that have been used successfully include propane, isobutane, normal pentane, isopentane, isooctane (2,2,4-trimethylpentane), cyclohexane, and methylcyclohexane. The heavier paraffinic diluents gave better results than the lighter ones, probably because they are better solvents for the heavy polymer.

The polymerization can be effected with a fixed-bed catalyst or with a mobile catalyst. A frequently preferred method of conducting the polymerization reaction comprises contacting the feed olefin with a slurry of the comminuted chromium axide catalyst in suspension in the solvent or diluent. The catalyst can be maintained in suspension by mechanical agitation device and/or by virtue of the velocity of the incoming feed or diluent. In this type of operation, a large portion of the product polymer remains associated with the catalyst, which is withdrawn from the reaction zone, as a slurry. The polymer is recovered by dissolution in a solvent of the type described, usually with the aid of heat and agitation, and the stripped catalyst is recycled and/or regenerated. The regeneration is accomplished by oxidizing the residual carbonaceous deposit with a controlled concentration of oxygen in an inert gas by conventional procedures.

Preferred hydrogenated diene polymers are prepared according to the method disclosed in a copending application of Jones and Moberly, Serial No. 359,291, filed November 30, 1953. Jones and Moberly disclose that a new class of materials can be produced by hydrogenating rubbery polybutadienes. These hydrogenated materials are thermoplastic and can be blended easily with the polymers of the 1-olefins. Preferred are homopolymers of butadiene and copolymers of butadiene and styrene using not over 30 parts by weight of styrene per 100 parts by weight of monomers. These polymers are prepared by emulsion polymerization, the temperature for the polymerization ranging from −5° F. to 140° F., preferably from 20 to 60° F. Such polymerization provides approximately 75 to 85 percent of 1–4 addition in the polymer while 15 to 25 percent of the polymer is formed as a result of 1-2 addition.

The hydrogenation procedure is a catalytic one using a nickel-kieselguhr catalyst. In the process, the butadiene polymer, substantially free of salts or other materials which might act as hydrogenation catalyst poisons, is charged to the hydrogenation reactor in the form of a solution or dispersion in a solvent. Suitable solvents include saturated cylic hydrocarbons such as cyclohexane, methylcyclohexane, decalin, and the like, preferably boiling above atmospheric pressure. Aromatic hydrocarbons, such as benzene and toluenes; cyclic ethers, such as dioxane; paraffinic hydrocarbons, such as isooctanes, isoheptanes, and normal heptanes; hydroaromatic hydrocarbons, such as tetralin, and the like, can also be used. Mixtures of solvents and/or dispersants can be used, if desired.

Following mixture with the solvent, the hydrogenation catalyst is added, hydrogen is added, and the temperature raised to a suitable level to initiate the reaction. Reaction pressures are preferably in the range from atmospheric to 3000 p. s. i. g., the usual range being 100 to 1000. The temperature can range from 75° F. up to the degradation temperature of the polymer, maximum temperatures ranging as high as 700 to 1000° F. The preferred range is between 300 and 600° F. Hydrogenation is continued until the unsaturation is 5 to 50 percent of theoretical. Following hydrogenation the catalyst is removed and the hydrogenated polymer is recovered from the solvent. For further details of the catalyst preparation and the process details, attention is directed to the above-identified Jones and Moberly application.

The amount of polyethylene or other 1-olefin polymer employed in these compositions may vary in the range between 5 and 95 parts by weight per 100 parts of the polymer blend. The type of product desired as well as the characteristics of the individual polymers will determine the amounts used for production of a given plastic composition.

Organic peroxides and hydroperoxides which are applicable are those which decompose in contact with the organic polymers in the range between 200 and 500° F. Among the compounds which can be employed are benzoyl peroxide, diethyl peroxide, di-tert-butylperoxide, tetralin hydroperoxide, 2,2 bis tertbutyl peroxybutane, tert-butyl hydroperoxide, methyl amyl ketone peroxide, para-chlorobenzoyl peroxide, and dibenzaldiperoxide. The preferred group of these compounds contain from 2 to 30 carbon atoms.

The amount of peroxidic material employed is generally in the range between 0.5 and 10 parts by weight per 100 parts of the polymer blend.

The plastic compositions of this invention can be compression or injection molded or extruded. They are suitable for making various types of molded objects, films, pipe, gaskets, dishes, flexible containers, etc.

The following examples set forth specific embodiments of the composition of this invention and methods of preparing the same. Although they set forth preferred conditions and limitations, they should not be considered as unduly limiting.

Example I

Polybutadiene having a Mooney value (ML-4) of approximately 20 to 22 was prepared in a series of runs by emulsion polymerization at 41° F. The different polybutadiene rubbers were hydrogenated in a series of six runs using a temperature of 400° F., a pressure of 500 p. s. i. g., a reduced nicked-on-kieselguhr catalyst, and methylcyclohexane as the solvent or dispersing medium for the polymer. The products obtained were blended to give a hydrogenated polybutadiene having an average unsaturation of 22.3 percent.

Ethylene was polymerized over a fixed bed chromium oxide-silica-alumina catalyst containing 2.4 weight percent chromium as chromium oxide (approximately 85 percent hexavalent chromium) operating at 320° F. and a pressure of 395 p. s. i. g. Isooctane was used as the solvent. The ethylene feed rate was 1.2 pounds/hour and the isooctane feed rate was 104 pounds/hour. The concentration of ethylene in the reactor effluent was 1.9 weight percent. The polymer had a molecular weight of 17,500 (determined by intrinsic viscosity method), a density of 0.953, and a melting point of 244±2° F.

A blend containing 30 percent by weight of the hydrogenated polybutadiene and 70 percent by weight of the ethylene polymer was prepared by mixing the materials on a roll mill at 300° F. for approximately 10 minutes. A portion of the blend was reserved as a control. The rolls were cooled to 220° F and benzoyl peroxide in benzene was added slowly using 7 parts by weight benzoyl peroxide in 14 parts benzene per 100 parts by weight of the polymer blend. At this temperature the benzene evaporated quickly and the benzoyl peroxide was readily dispersed in the composition. Samples of both types of material, i. e., with and without benzoyl peroxide, were placed in slab molds, heated to 300° F., and the temperature maintained at this level for 20 minutes. Results of physical tests on the two compositions are shown below:

0.070 part $FeSO_4.7H_2O$, and 0.054 part diisopropylbenzene hydroperoxide was added at 16 hours (24 percent conversion). After 26 hours the conversion had reached 44 percent. The Mooney value (ML-4) of the vented latex was 26.

The polybutadiene (650 grams) was hydrogenated at 400° F. and a pressure of 500 p. s. i. g. in the presence of a reduced nickel-on-kieselguhr catalyst using a total of 10 liters of methylcyclohexane as the solvent or dispersing medium for the reaction. The reaction period was 3 hours. The hydrogenated product had an average unsaturation of 10.6 percent.

Ethylene was polymerized in a continuous process using a reactor provided with a stirrer. Polymerizations were effected in the presence of a chromium oxide-silica-alumina catalyst containing 2.5 weight percent chromium as chromium oxide (approximately 85 percent hexavalent chromium), using cyclohexane as the solvent. Reaction conditions in four runs and physical properties of the products were as follows:

|  | Runs | | | |
|---|---|---|---|---|
|  | 1 | 2 | 3 | 4 |
| Reactor pressure, p. s. i. g | 420 | 415 | 415 | 415 |
| Reactor temperature, ° F | 286 | 286 | 286 | 286 |
| Feed rate, lbs./hr.: | | | | |
| Ethylene | 3.6 | 3.6 | 3.6 | 3.6 |
| Catalyst | 0.091 | 0.088 | 0.090 | 0.098 |
| Cyclohexane | 25 | 25 | 25 | 25 |
| Ethylene in reactor, wt. percent | 12.6 | 12.6 | 12.2 | 12.5 |
| Catalyst in reactor, wt. percent | 0.317 | 0.307 | 0.314 | 0.341 |
| Density | 0.960 | 0.961 | | 0.957 |
| Melting point, ° F | 251±2 | 254±2 | | 251±2 |
| Impact strength (falling ball) [1] | >72 in. | >72 in. | | >72 in. |
| Melt index [2] | 1.037 | 0.941 | 1.042 | |
| Molecular weight [3] | 41,100 | 41,800 | 41,000 | 43,600 |

[1] Determined by dropping a 93 gram ball from a measured height onto compression molded samples of approximately one-eighth inch thickness.
[2] ASTM D 1238-52T, rate of extrusion of a thermoplastic material through an orifice of a specified length and diameter under prescribed conditions of temperature and pressure.
[3] Determined from melt index.

Products from the first three runs were blended and

| Run No. | Flex Temp., ° F. | Tensile, p. s. i.[1] | Elongation, Percent [1] | Tensile, p. s. i.[2] | Elongation, Percent [2] | Softening Point, ° F. | Remarks |
|---|---|---|---|---|---|---|---|
| 1 (with peroxide) | −19 | 2,077 | 35 | 1,630 | 100 | [3] 248 | Remains rubbery at 260° F. |
| 2 (control) | Too brittle to measure. | 239 | 5 | 2,240 | 6 | [4] 249 | Soft at 260° F. |

[1] Drawn at 20 inches/min. (test for flexible plastics).
[2] Drawn at 0.2 inch/min. (test for rigid plastics).
[3] Insoluble in boiling methylcyclohexane (indicates cross-linking).
[4] Soluble in methylcyclohexane.

Example II

Polybutadiene was prepared by emulsion polymerization at 41° F. in accordance with the following recipe:

| | |
|---|---|
| Water | 180 |
| Butadiene | 100 |
| Santomerse #3 [1] | 1.25 |
| KOH | 0.05 |
| $K_4P_2O_7$ | 0.165 |
| $FeSO_4.7H_2O$ | 0.139 |
| Diisopropylbenzene hydroperoxide | 0.107 |
| Tertiary dodecyl mercaptain | 0.80 |
| Benzene | 0.4 |
| Shortstop: Dinitrochlorobenzene | 0.2 |
| Antoxidant (percent based on polymer): polygard [2] | 1.0 |

[1] Alkyl aryl sodium sulfonate.
[2] Tris-nonylphenyl phosphite.

A booster containing 5 parts water, 0.083 part $K_4P_2O_7$, the resulting material used to prepare various blends with hydrogenated polybutadiene (runs 1-6 in the following table). The product from the fourth run described above was used in runs 9 and 10 in the following table.

Several blends containing variable amounts of the hydrogenated polybutadiene and ethylene polymer were prepared, with and without benzoyl peroxide. The two polymers were first mixed on a roll mill at 300° F. for approximately 10 minutes after which a dispersion containing 20 weight percent benzoyl peroxide in xylene was added and milling was continued for 25 to 35 minutes at the same temperature. In each sample in which benzoyl peroxide was used, approximately 3 percent by weight based on the polymer was added. The mixing conditions were sufficient to evaporate the xylene and cause the benzoyl peroxide to be dispersed in the composition. Samples of the materials were placed in slab molds and heated 5-10 minutes at 300° F. Results of physical tests are shown below:

| Run No. | Polymer Blends, Pts. by Wt. Hydrogenated Polybutadiene | Ethylene Polymer | Benzoyl Peroxide Present | Flex Temp., °F. | Tensile, p. s. i.[1] | Elongation, Percent [1] | Impact Strength, Izod [2] |
|---|---|---|---|---|---|---|---|
| 1 | 30 | [3] 70 | No (control) | −10 | 2,388 | 38 | 6.3. |
| 2 | 30 | [3] 70 | Yes | −21 | 2,180 | 172 | 4.7. |
| 3 | 50 | [3] 50 | No (control) | −44 | 1,810 | 46 | 9.5. |
| 4 | 50 | [3] 50 | Yes | −43 | 2,021 | 183 | 12.7. |
| 5 | 70 | [3] 30 | No (control) | −54 | 907 | 185 | 7.7. |
| 6 | 70 | [3] 30 | Yes | −66 | 1,364 | 346 | 9.3. |
| 7 | 100 | | No (control) | −85 | 2,500 | 750 | Too flexible to measure. |
| 8 | 100 | | Yes | −84 | 1,488 | 504 | Do. |
| 9 | | [4] 100 | No (control) | +63 | 4,307 | 20 | |
| 10 | | [4] 100 | Yes | +65 | 4,367 | 15 | |
| 11 | 30 | [5] 70 | No (control) | −53 | 1,548 | 660 | 10.2. |
| 12 | 30 | 70 | Yes | −47 | 1,536 | 478 | 10.4. |

[1] Samples drawn at rate of 20 inches per minute.
[2] Ft. lbs./in. ASTM D 256-47T, cantilever beam test.
[3] Blend of products from runs 1-3 described in preceding table.
[4] Product from run 4 in preceding table.
[5] Commercial polyethylene (Bakelite's DYNH).

The molecular weights mentioned herein are weight average molecular weights and were calculated according to the equation $$M = \frac{4.03 \times 10^3 \times N_i \times 14}{2.303}$$

where M is the weight average molecular weight and $N_i$ is the intrinsic viscosity as determined for a solution of 0.2 gram of the polymer in 50 cc. of tetralin at 130° C. This type of molecular weight determination is described by Kemp and Peters, Ind. Eng. Chem., 35, 1108 (1943) and by Drenes and Klemm, J. Applied Phys., 17, 458 (June 1946).

As many possible embodiments may be made of this invention without departing from the scope thereof, it is to be understood that all matter herein set forth is to be interpreted as illustrative and not in a limiting sense.

I claim:

1. As a new composition of matter, cured blend of a hydrogenated rubbery homopolymer of 1,3-butadiene prepared by emulsion polymerization, the unsaturation of said polymer having been reduced by hydrogenation to a value within the range of 5 to 50 percent of theoretical, and 5 to 95 parts per 100 parts of the blend of a solid polymer of ethylene, said blend having been cured by heating same in the presence of 0.5 to 10 parts by weight of benzoyl peroxide at a temperature of 200 to 500° F. for 5 to 60 minutes, said benzoyl peroxide being the sole curing agent.

2. As a new composition of matter, a cured blend of a hydrogenated rubbery homopolymer of 1,3-butadiene prepared by emulsion polymerization, the unsaturation of said polymer having been reduced by hydrogenation to a value within the range of 5 to 50 percent of theoretical, and 5 to 95 parts per 100 parts of the blend of a solid polymer of ethylene having a density of at least 0.94 and a crystallinity of at least 70 percent, said blend having been cured by heating same in the presence of 0.5 to 10 parts by weight of benzoyl peroxide at a temperature of 200 to 500° F. for 5 to 60 minutes, said benzoyl peroxide being the sole curing agent.

3. A method of curing a blend of a hydrogenated rubbery polymer selected from the group consisting of polybutadiene and butadiene/styrene copolymers prepared by emulsion polymerization, the unsaturation of said polymer having been reduced to a value within the range of 5 to 50 percent of theoretical and 5 to 95 parts per 100 parts of the blend of a solid polymer of a 1-olefin of maximum chain length of 8 carbon atoms and no branching nearer the double bond than the 4-position, comprising heating said blend in the pressure of at least one organic peroxide which decomposes within the range of 200 to 500° F., said peroxide being the sole curing agent.

4. A method of curing a blend of a hydrogenated rubbery homopolymer of 1,3-butadiene prepared by emulsion polymerization, the unsaturation of said polymer having been reduced by hydrogenation to a value within the range of 5 to 50 percent of theoretical, and 5 to 95 parts per 100 parts of the blend of a solid polymer of ethylene, comprising mixing with said blend from 0.5 to 10 parts by weight of benzoyl peroxide and heating the resulting mixture at a temperature of 200 to 500° F. for 5 to 60 minutes, said benzoyl peroxide being the sole curing agent.

5. A method of curing a blend of a hydrogenated rubbery homopolymer of 1,3-butadiene prepared by emulsion polymerization, the unsaturation of said polymer having been reduced by hydrogenation to a value within the range of 5 to 50 percent of theoretical, and 5 to 95 parts per 100 parts of the blend of a solid polymer of ethylene having a density of at least 0.94 and a crystallinity of at least 70 percent, comprising mixing with said blend from 0.5 to 10 parts by weight of benzoyl peroxide and heating the resulting mixture at a temperature of 200 to 500° F. for 5 to 60 minutes, said benzoyl peroxide being the sole curing agent.

6. As a new composition of matter, a cured blend of a hydrogenated polymer selected from the group consisting of polybutadiene and butadiene/styrene copolymers prepared by emulsion polymerization, the unsaturation of said polymer having been reduced to a value within the range of 5 to 50 percent of theoretical by hydrogenation and 5 to 95 parts per 100 parts of the blend of a solid polymer of a 1-olefin of maximum chain length of 8 carbon atoms and no branching nearer the double bond than the 4-position, said blend having been cured by heating same in the presence of at least one organic peroxide which decomposes within the range of 200 to 500° F., said peroxide being the sole curing agent.

7. As a new composition of matter, a cured blend of hydrogenated polymer selected from the group consisting of polybutadiene and butadiene/styrene copolymers prepared by emulsion polymerization, the unsaturation of said polymer having been reduced to a value within the range of 5 to 50 percent of theoretical by hydrogenation and 5 to 95 parts per 100 parts of the blend of a solid polymer of a 1-olefin of maximum chain length of 8 carbon atoms and no branching nearer the double bond than the 4-position, the unsaturation of said 1-olefin polymer being prepondenantly trans-internal and terminal vinyl, trans-internal unsaturation being

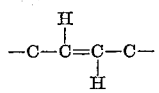

said blend having been cured by heating same in the presence of at least one organic peroxide which decomposes within the range of 200 to 500° F., said peroxide being the sole curing agent.

8. A method of curing a blend of a hydrogenated rubbery polymer selected from the group consisting of polybutadiene and butadiene/styrene copolymers prepared by emulsion polymerization, the unsaturation of said polymer having been reduced to a value within the range of 5 to 50 percent of theoretical by hydrogenation and 5 to 95 parts per 100 parts of the blend of a solid polymer of a 1-olefin of maximum chain length of eight carbon atoms and no branching nearer the double bond than the 4-position, comprising dispersing at least one organic peroxide which decomposes within the range of 200 to 500° F. in a hydrocarbon solvent, adding the resulting dispersion to a blend of said polymers on a hot mill at a temperature below the decomposition temperature of the peroxidic material used, milling for a time necessary to produce a homogeneous composition and to evaporate the solvent, and subsequently heating a ta temperature within the range of 200 to 500° F. to decompose the peroxidic material, said peroxidic material being the sole curing agent.

9. The method of claim 8 wherein said rubbery polymer is a homopolymer of 1,3-butadiene, said 1-olefin is ethylene, and said peroxidic material is benzoyl peroxide.

10. The method of claim 8 wherein said rubbery polymer is a homopolymer of 1,3-butadiene, said 1-olefin is ethylene, said peroxidic material is benzoyl peroxide, and said organic solvent is selected from the group consisting of benzene, toluene, xylene, methylcyclohexane and octanes.

References Cited in the file of this patent
UNITED STATES PATENTS

| | | |
|---|---|---|
| 2,628,214 | Pinkney et al. | Feb. 10, 1953 |
| 2,692,257 | Zletz | Oct. 19, 1954 |

OTHER REFERENCES

Chemistry and Technology of Rubber, by Blake and Davis, Copyright 1937, Reinhold Publishing Co., New York, page 636.

UNITED STATES PATENT OFFICE
CERTIFICATE OF CORRECTION

Patent No. 2,877,206                                                              March 10, 1959

Johnny N. Scott

It is hereby certified that error appears in the printed specification of the above numbered patent requiring correction and that the said Letters Patent should read as corrected below.

Column 1, line 33, for "elongatiton" read -- elongation --; column 2, line 36, for "containued" read -- continued --; column 4, line 73, for "The" read -- This --; column 5, line 61, for "chronium axide" read -- chromium oxide --; column 7, line 10, for "nicked-on-kieselguhr" read -- nickel-on-kieselguhr --; line 68, Example II, in the table, first column thereof, for "mercaptain" read -- mercaptan --; column 9, line 45, before "cured" insert the letter "a"; column 10, line 2, for "pressure" read -- presence --; column 11, line 1, for "prepondenantly" read -- preponderantly --; column 12, line 2, for "a ta" read -- at a --.

Signed and sealed this 25th day of August 1959.

(SEAL)
Attest:

KARL H. AXLINE
Attesting Officer

ROBERT C. WATSON
Commissioner of Patents